Jan. 12, 1971  D. M. STEVENS  3,553,761
WINDSCREEN WIPER SYSTEMS
Filed May 5, 1958  3 Sheets-Sheet 3
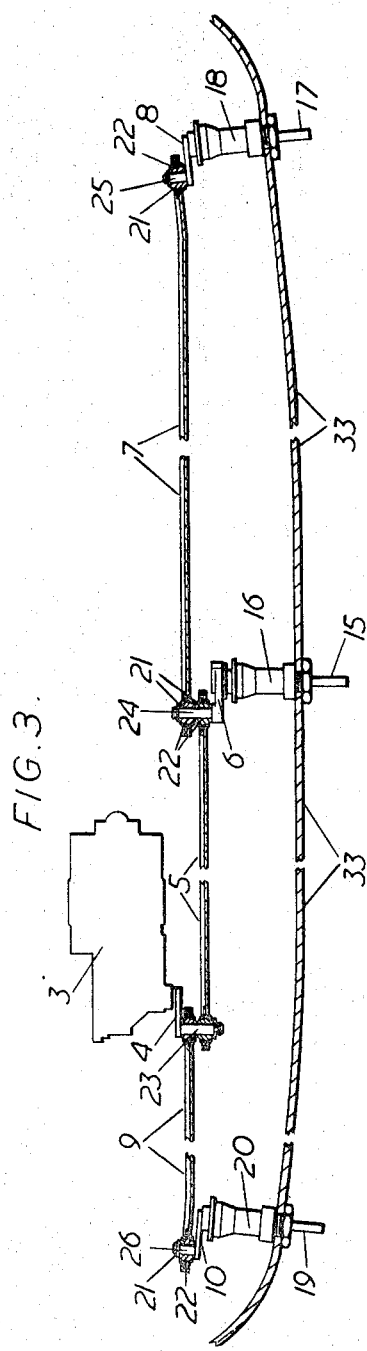
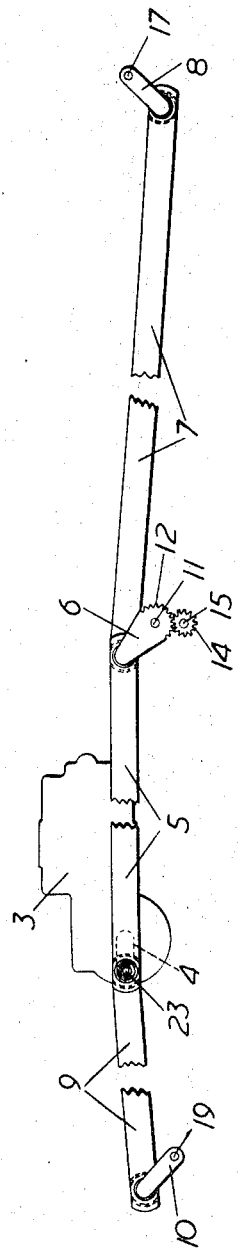
Inventor
*Derek N. Stevens*
By *D. C. Staley*
His Attorney

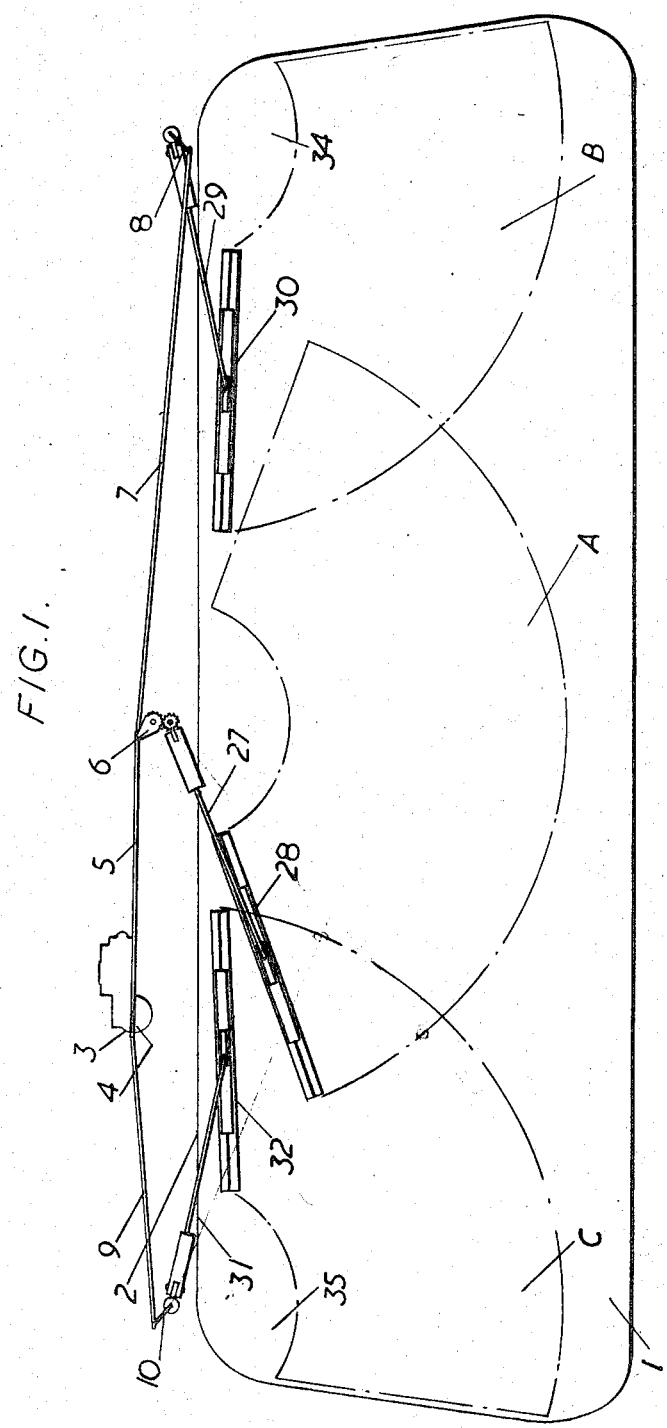

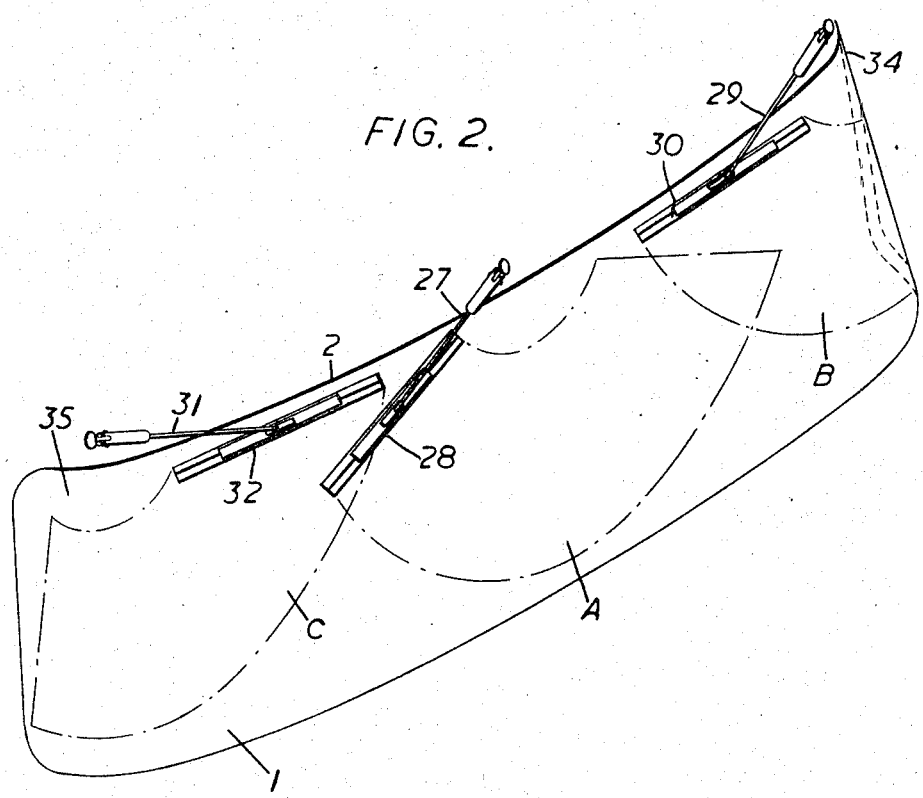

United States Patent Office 3,553,761
Patented Jan. 12, 1971

3,553,761
WINDSCREEN WIPER SYSTEMS
Derek Norman Stevens, Dunstable, England, assignor to General Motors Corporation, Detroit, Mich., a corporation of Delaware
Filed May 5, 1958, Ser. No. 732,890
Claims priority, application Great Britain, May 10, 1957, 14,902/57
Int. Cl. A47l 1/02
U.S. Cl. 15—250.14                    11 Claims This invention relates to windscreen wiper systems.

A windscreen wiper system according to the invention is suitable for use with flat and slightly curved windscreens but is applicable in particular for use with curved windscreens having such a pronounced curvature at the side portions thereof that the side portions lie in planes substantially at right angles to the central portion of the windscreen. Such windscreens are commonly referred to as "wrap-around" windscreens and will be so referred to hereinafter.

Windscreen wipers of the kind commonly employed hitherto with flat windscreens are not fully effective on wrap-around windscreens because the normal range of movement of the wiper arm and blade and its position relative to the curved side portions of the windscreen does not enable the wiper blade to maintain sufficient pressure on the side portions of the windscreen to ensure effective wiping; nor can a sufficient area of the side portions be wiped to maintain a desired degree of clear vision through the side portions when they are being obscured by rain, mud or the like.

By means of the invention a large proportion of the area of a windscreen, and particularly of a wrap-around windscreen, can be effectively wiped without the employment of complicated or expensive additional mechanism.

A windscreen wiper system according to the invention, for use in particular with a wrap-around windscreen, has a main wiper arm and blade arranged to wipe a central portion of the windscreen and two auxiliary wiper arms and blades arranged to wipe portions of the windscreen to each side of the central portion thereof.

The auxiliary wiper arms and blades are each arranged for oscillation throughout arcs of substantially 90° between a substantially horizontal and a substantially vertical position, and their paths of movement partially overlap portions of that of the main wiper arm and blade which is arranged for oscillation throughout a greater arc.

Thus the auxiliary wiper arms and blades may each operate over an arcuate region which extends from near a side edge of the windscreen to near the upper (or lower) edge thereof; and the main arm and blade may operate over a central arcuate region each end of which overlaps that end of the arcuate region of an auxiliary blade which is adjacent the upper (or lower) edge of the windscreen, the auxiliary arms and blades moving through arcs of substantially 90° and the main arm and blade through an arc of, say, 140°.

The auxiliary wiper arms are preferably pivotally mounted at points adjacent the upper (or lower) ends of the most sharply curved side portions of the windscreen so that over the central portion of its movement each auxiliary wiper arm and blade will lie substantially parallel to the axis of revolution of the acutely curved side portion of the wrap-around windscreen. Such an arrangement reduces the variation in curvature which the wiper blade has to assume as it passes over the acutely curved side portions of the windscreen.

The scope of the invention is defined by the appended claims; and how it can be performed is hereinafter particularly described with reference to the accompanying drawings in which:

FIG. 1 is an elevation of a wrap-around windscreen, viewed from its convex side, with the windscreen wiper system therefor shown diagrammatically;

FIG. 2 is a perspective view of the same windscreen with the paths of movement of the wiper arms and blades shown thereon;

FIG. 3 is a plan of the actuator mechanism of the windscreen wiper system shown diagrammatically in FIG. 1; and FIG. 4 is a front elevation of the windscreen wiper actuator mechanism of FIG. 3 with the pivot housings removed therefrom.

FIG. 1 shows a wrap-around windscreen 1 for a motor vehicle with a windscreen wiper system arranged adjacent the upper edge 2 of the windscreen. The windscreen wiper actuator mechanism comprises a motor 3 with a drive crank 4 which is connected by a link 5 to a main pivot crank 6 which is also connected by a link 7 to an auxiliary pivot crank 8 at the right-hand side of the windscreen 1 as viewed in FIG. 1. The drive crank 4 is also connected by a link 9 to a further auxiliary pivot crank 10 mounted at the left-hand end of the upper edge 2 of the windscreen 1 as viewed in FIG. 1.

As shown in FIGS. 3 and 4 the main pivot crank 6 is mounted on a pivot shaft 11 and has formed integral therewith a toothed segment 12 which meshes with a pinion 14 secured on a main wiper pivot shaft 15.

The shafts 11 and 15 are journalled in a pivot housing 16 mounted in a part 33 of the vehicle bodywork adjacent the upper edge 2 of the windscreen.

The auxiliary pivot crank 8 is secured on an auxiliary wiper pivot shaft 17 mounted in a pivot housing 18 which is similarly mounted adjacent the upper edge 2 of the windscreen 1, but the auxiliary wiper pivot shaft 17 is at an angle to the main wiper pivot shaft 15.

The auxiliary pivot crank 10 is secured on an auxiliary wiper pivot shaft 19 which is mounted in a pivot housing 20 secured adjacent to the upper edge 2 of the windscreen 1 in a similar manner to the pivot housings 16 and 18. The auxiliary wiper pivot shaft 19 is also arranged at an angle to the main wiper blade shaft 15, the axes of the shafts 17 and 19 diverging from that of the shaft 15 forwardly of the windscreen 1.

In order to accommodate movement of the links 7 and 9 in a horizontal plane, due to the angular relation between the auxiliary wiper pivot shafts 17 and 19 and the main wiper pivot shaft 15, the links 5, 7 and 9 are each provided at their ends with sockets 21 which are engaged by part-spherical bushes 22 rotatably mounted on the respective pins 23, 24, 25 and 26 of the cranks 4, 6, 8 and 10.

As shown in FIGS. 1 and 2 a main wiper arm 27 and blade 28 carried by the main wiper pivot shaft 15 are adapted to oscillate so as to wipe an arcuate region A subtending an angle of approximately 140° over a central part of the windscreen 1.

Two auxiliary wiper arms and blades 29, 30; 31, 32 respectively mounted on the auxiliary wiper pivot shafts 17 and 19 are each adapted to oscillate so as to wipe arcuate regions B and C respectively each subtending an angle of approximately 90° over portions of the windscreen to each side of the region A wiped by the main wiper blade 28, the inboard ends of the arcuate regions B and C of the auxiliary wiper blades 30, 32 overlapping an end portion of the arcuate region A wiped by the main wiper blade 28.

Accordingly, as shown in FIG. 1, the wiper blades 28, 30, 32 are arranged so that at one extremity of their respective paths of movement, in which the blades are in their "parked" positions, the auxiliary wiper blades lie outside the ends of the arcuate region wiped by the main wiper blade, the relative positions being such, and the movements of the auxiliary wiper blades 30, 32 and the main wiper blade 28 being so corelated, that the positions of the main and the auxiliary wiper blades do not coincide at any time during their oscillatory movement.

As seen particularly in FIGS. 1, 3 and 4, during rotation of the crank arm 40 so as to effect movement of the links 9 and 5 to the right as viewed in FIGS. 1, 3 and 4, the pivot shaft 19 will be oscillated in the clockwise direction and the pivot shaft 17 will be oscillated in the counterclockwise direction. On the other hand, during movement of the links 5 and 9 to the left, as viewed in FIGS. 1, 3 and 4, upon rotation of the crank 4, the pivot shaft 19 will be oscillated in the counterclockwise direction while the pivot shafts 14 and 17 will be oscillated in the clockwise direction. Thus, wiper blades 32 and 28 which are driven by wiper arms 31 and 27, respectively, from pivot shafts 19 and 15, respectively, will be simultaneously oscillated in phase opposition. Similarly, wiper blades 32 and 30 carried by wiper arms 31 and 29, respectively, are driven by pivot shafts 14 and 17, respectively, will also be simultaneously oscillated in phase opposition. However, wiper blades 28 and 30 carried by arms 27 and 29, respectively, and driven by shafts 14 and 17, respectively, will be simultaneously oscillated in phase.

This is conveniently achieved by the provision of the cooperating geared segment 12 and pinion 14 whereby the main wiper arm 27 and blade 28 oscillate in synchronism with, but at different speeds from, the auxiliary wiper arms and blades 29, 30; 31, 32.

As shown in FIG. 3, the auxiliary wiper pivot shafts 17 and 19 are arranged at points adjacent the upper edge 2 of the windscreen 1 which are at or near the more sharply curved side portions 34 and 35 of the windscreen 1, the axes of the pivot shafts 17 and 19 extending radially, or substantially radially of the axis of revolution of said side portions 34 and 35. The arcuate region traversed by each of the blades 30 and 32 extends from a line adjacent and substantially parallel to the upper edge 2 of the windscreen 1 to a line adjacent and substantially parallel to the side edge of the windscreen.

In this way the sharply curved side portions of the windscreen (which would not be wiped, or which would be inadequately wiped with the use of a conventional windscreen wiper system) are effectively wiped so that the driver of the vehicle will have a field of vision through a portion of the windscreen extending without interruption from one side of the windscreen to the other and over which the windscreen wipers will operate.

Although the invention is of particular advantage with "wrap-around" windscreens, it is also applicable with advantage to curved windscreens not having such sharply curved side portions, and to flat windscreens. The invention is also of particular advantage with a windscreen the width of which is large in proportion to its depth, as, for example, with lorries.

Although in the embodiment of the invention described and illustrated the wipers are driven from the motor 3 through the intermediary of links, it will be understood that other forms of actuator mechanism, such as are well known in the art, may be used, for example a pulley and cable drive, a Bowden wire mechanism, or a hydraulically or pneumatically actuated mechanism.

I claim:

1. A wiper system for a windscreen, including, a main wiper arm and blade arranged to wipe a central portion of the windscreen, two auxiliary wiper arms and blades respectively arranged to wipe portions of the windscreen to each side of the central portions and having paths which overlap portions of the path of said main blade, and single motor means operatively connected to said arms for imparting in phase movement to said main arm and one of said auxiliary arms and movement to said other auxiliary arm in phase opposition thereto so as to preclude interference between said blades in the overlapping portions of their paths.

2. A windscreen wiper system for a wrap-around windscreen having a central curved portion and lateral portions extending rearwardly of the central portion and integrally connected thereto by portions of sharper curvature, including a main wiper arm and blade arranged to wipe a region of said central portion, a pair of auxiliary wiper arms and blades respectively arranged to wipe said lateral portions including at least a part of the more sharply curved portions and having paths which overlap portions of the path of said main blade, and single motor means operatively connected to said arms for imparting in phase movement to said main arms and one of said auxiliary arms and movement to said other auxiliary arm in phase opposition thereto so as to preclude interference between said blades in the overlapping portions of their paths.

3. A windscreen wiper system for a wrap-around windscreen having a central curved portion and more sharply curved side portions, including, a main wiper arm and blade arranged for oscillation over said central portion throughout an arc of approximately 140°, two auxiliary wiper arms and blades respectively arranged for oscillation throughout arcs of approximately 90° from a horidontal edge of said windscreen to a side edge thereof, the inboard end of the arcuate region traversed by each said wiper arm and blade overlapping an end of the arcuate region traversed by the main wiper arm and blade, and single motor means operatively connected to said arms for imparting in phase oscillation to said main arm and one of said auxiliary arms and oscillation to said other auxiliary arm in phase opposition thereto.

4. A windscreen wiper system for a wrap-around windscreen having a central curved portion and more sharply curved side portions, including, a main wiper arm and blade arranged for oscillation over said central portion throughout an arc of approximately 140°, two auxiliary wiper arms and blades respectively arranged for oscillation throughout arcs of approximately 90° from the upper edge of said windscreen to a side edge thereof, the inboard end of the arcuate region traversed by each said wiper arm and blade overlapping an end of the arcuate region traversed by the main wiper arm and blade, a wiper motor, and drive means interconnecting said drive motor and said arms for imparting in phase oscillation to said main arm and one of said auxiliary arms and oscillation to said other auxiliary arm in phase opposition thereto.

5. A windscreen wiper system for a wrap-around windscreen having a central curved portion and more sharply curved side portions, including, a main wiper arm and blade arranged for oscillation over said central portion throughout an arc of approximately 140°, two auxiliary wiper arms and blades respectively arranged for oscillation throughout arch of approximately 90° from points near the upper edge of the windscreen at said more sharply curved side portions to near the side edges of the windscreen, the inboard end of the arcuate region transversed by each said auxiliary wiper arm and blade overlapping an end of the arcuate region traversed by the main wiper arm and blade, and single motor means operatively connected to said arms for imparting in phase oscillation to said main arm and one of said auxiliary arms and oscillation to said other auxiliary arm in phase opposition thereto.

6. A windscreen wiper system for a wrap-around windscreen having a central curved portion and more sharply curved side portions, including, a drive motor, a main wiper pivot shaft operatively connected with said motor and arranged adjacent the upper edge of the central portion of the windscreen for oscillation by said motor throughout an arc of approximately 140°, a pair of auxiliary wiper pivot shafts respectively arranged adjacent the upper edge of the more sharply curved side portions for oscillation by said motor throughout arcs of approximately 90° from points near the upper edge of the windscreen to near the side edges thereof, means connecting said auxiliary pivot shafts with said motor so that one auxiliary pivot shaft is oscillated in phase with said main pivot shaft and the other auxiliary pivot shaft is oscillated in phase opposition thereto, and a main and a pair of auxiliary wiper arms and blades respectively carried on said main pivot shaft and said auxiliary pivot shafts, the inboard ends of the arcuate region traversed by each said auxiliary wiper arm and blade overlapping an end of the arcuate region traversed by the main wiper arm and blade.

7. A windscreen wiper system according to claim 6, in which each said auxiliary wiper pivot shaft extends substantially radially of the axis of revolution of the more sharply curved side portion of the windscreen adjacent which it is mounted.

8. A windscreen wiper system according to claim 7, in which said drive motor has a rotary crank connected by links to cranks by which said main and said auxiliary wiper pivot shafts are adapted to be driven.

9. A windscreen wiper system according to claim 8, in which the crank for said main wiper pivot shaft carries a toothed segment which meshes with a pinion on a shaft carrying said main wiper arm and blade, said segment and pinion being adapted to effect oscillation of said main wiper pivot shaft in synchronism with, but throughout a greater arc than, said auxiliary wiper pivot shafts.

10. A windscreen wiper system for a wrap-around windscreen, comprising a drive motor, a main wiper shaft carrying a main wiper arm and blade arranged for oscillation over a central portion of said windscreen, a pair of auxiliary wiper shafts each carrying an auxiliary wiper arm and blade respectively arranged for oscillation over portions of the windscreen to each side of the central portion thereof and having paths which overlap portions of the path of said main blade, and means for transmitting the drive from said motor to said main and auxiliary wiper shafts for conjoint in phase oscillation of said main shaft and one of said auxiliary shafts and oscillation of the other auxiliary shaft in phase opposition thereto so as to preclude interference between said blades in the overlapping portions of their paths, said motor and said shafts being arranged adjacent a horizontal edge of said windscreen.

11. A windscreen wiper system for a wrap-around windscreen comprising a drive motor arranged adjacent an upper edge of said windscreen and carrying a rotatable crank, a main wiper shaft carrying a main wiper arm and blade arranged for oscillation over a central portion of said windscreen, a pair of auxiliary wiper shafts each carrying an auxiliary wiper arm and blade respectively arranged for oscillation over portions of the windscreen to each side of the central portion thereof, said main and said auxiliary shafts being arranged adjacent said upper edge of said windscreen, cranks mounted on said main and said auxiliary shafts and links inter-connecting said rotary crank to the other said cranks for conjoint oscillation of said wiper blades by said motor, said main arm and blade being arranged for oscillation over the central portion of the windscreen through an arc of substantialy 140° and said auxiliary arms and blades each being arranged for oscillation through arcs of substantially 90° on said portions of the windscreen which overlap the ends of the central arcuate portion.

References Cited

UNITED STATES PATENTS

| 1,447,541 | 3/1923 | Gates | 15—255 |
| 2,691,186 | 10/1954 | Oishei et al. | 15—253 |
| 2,760,221 | 8/1956 | Hitzelberger | 15—253 |
| 2,795,809 | 6/1957 | Vischulis | 15—255 |
| 2,825,919 | 3/1958 | Horton | 15—253 |

FOREIGN PATENTS

| 625,939 | 8/1927 | France. |

ROBERT W. JENKINS, Primary Examiner

U.S. Cl. X.R.

15—250.27

PO-1050
(5/69)

UNITED STATES PATENT OFFICE
CERTIFICATE OF CORRECTION

Patent No. 3,553,761          Dated March 12, 1971

Inventor(X) Derek N. Stevens

It is certified that error appears in the above-identified patent and that said Letters Patent are hereby corrected as shown below:

In the drawings, Sheets 1, 2 and 3, Line 1, "D. M. Stevens" should read -- D. N. Stevens --.

Column 3, line 9, "clockwise" should read -- counterclockwise --.

Signed and sealed this 1st day of June 1971.

(SEAL)
Attest:

EDWARD M. FLETCHER, JR.
Attesting Officer

WILLIAM E. SCHUYLER, JR.
Commissioner of Patents